June 30, 1942. J. T. WEBBER 2,288,560
THERMOHYDROMETER
Filed May 15, 1939    2 Sheets-Sheet 1
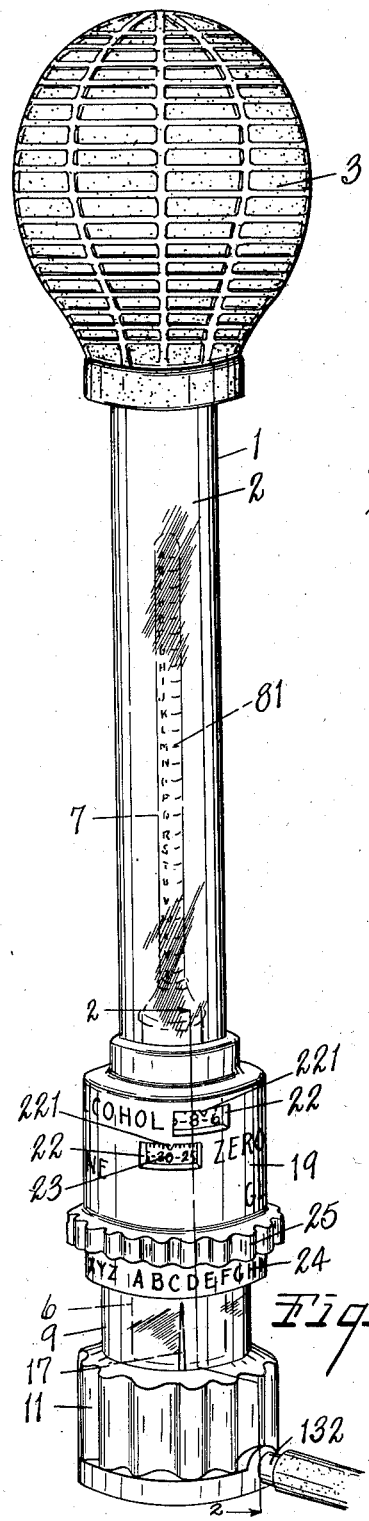
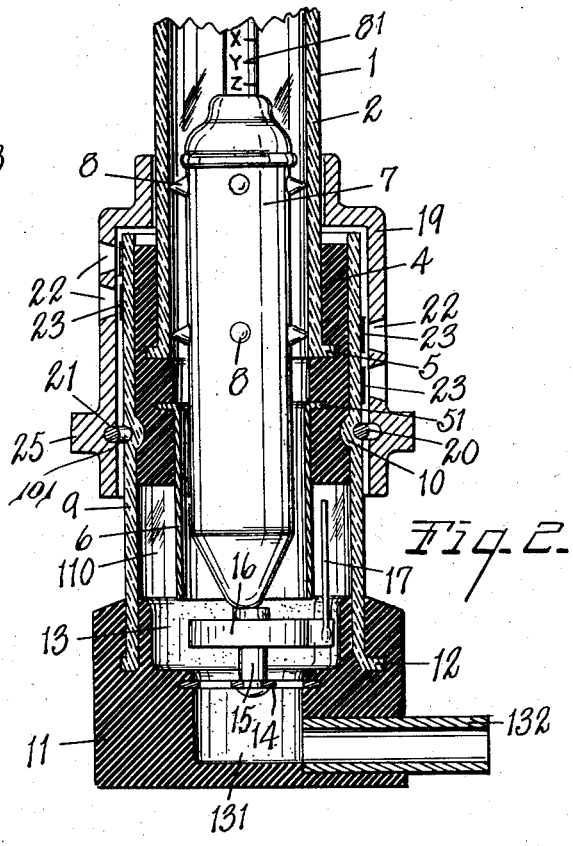
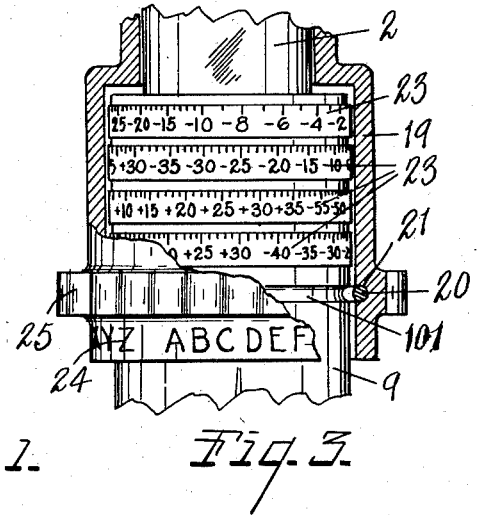
INVENTOR.
Joseph T. Webber
BY Earl D. Chappell
ATTORNEYS

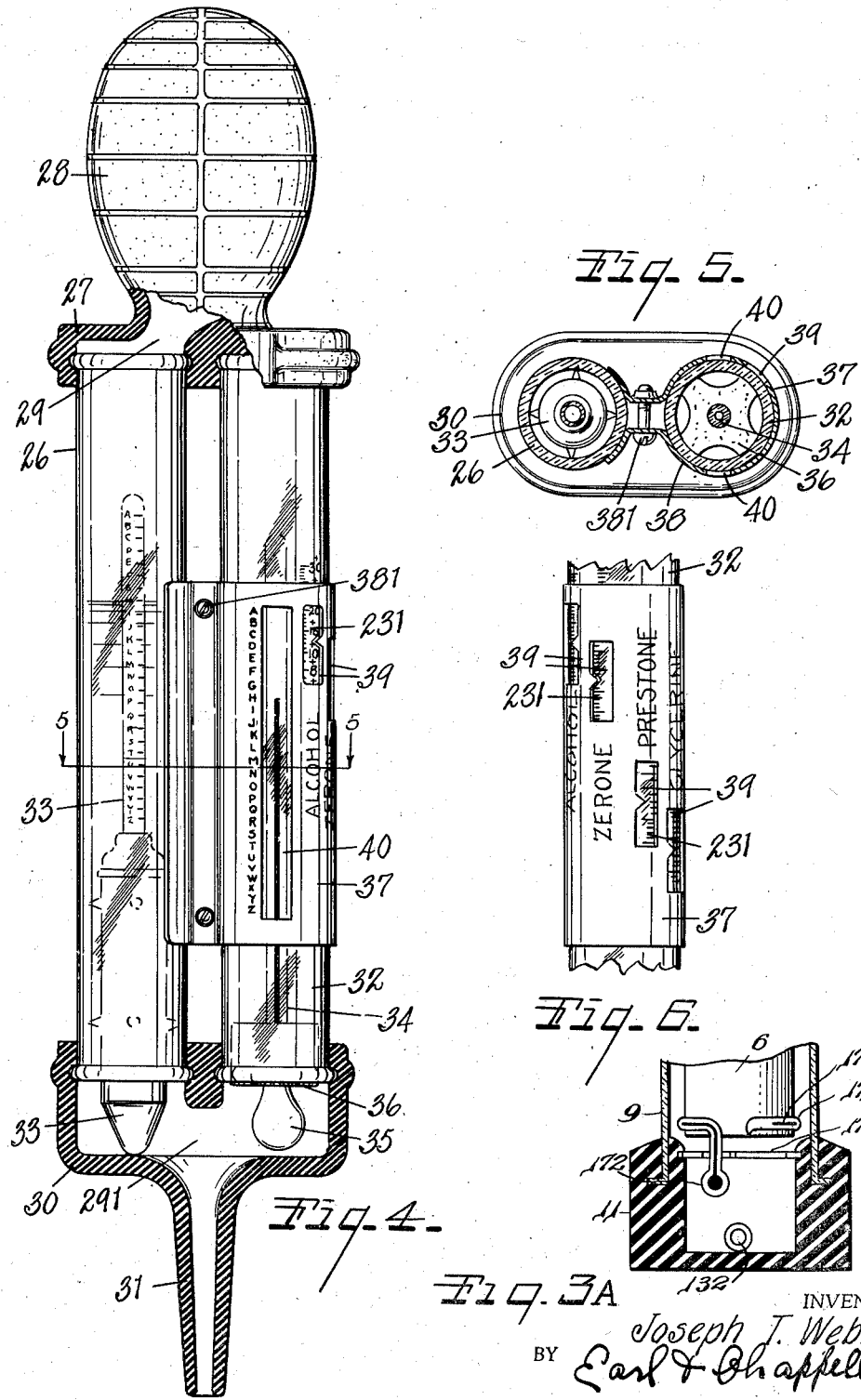

Patented June 30, 1942

2,288,560

UNITED STATES PATENT OFFICE 2,288,560

THERMOHYDROMETER

Joseph T. Webber, Oak Park, Ill., assignor to Roscoe B. Lacey, Chicago, Ill.

Application May 15, 1939, Serial No. 273,661

22 Claims. (Cl. 265—46)

This invention relates to improvements in thermohydrometer.

The main objects of my invention are:

First, to provide a testing device or instrument for ascertaining the specific gravity of a liqud, corrected for temperature.

Second, to provide an instrument of the type described whereby a final reading of specific gravity or freezing point of a liquid may be taken directly from the instrument without recourse to charts or tables and without requiring interpolation or other mental calculation on the part of the user.

Third, to provide an instrument or device of the type described which is extremely accurate in the readings which it provides due to elimination of errors arising from the above mentioned factors as well as errors which have hitherto arisen in similar devices by reason of the construction and arrangement of the parts thereof.

Fourth, to provide an instrument of the type described, in particular a device for determining the freezing point of liquids wherein the need for taking a separate reading of temperature in addition to a specific gravity reading is eliminated.

Fifth, to provide an instrument having novel means for preventing obscuring of a thermally responsive element included in the instrument whereby observation of the said element is facilitated.

Sixth, to provide a thermohydrometer having novel calculating means associated therewith whereby a direct reading of freezing point or corrected specific gravity may be readily had without recourse to mental calculation, charts, or tables.

Seventh, to provide a calculating device particularly adapted for association with a testing instrument and having means for ascertaining a temperature corrected property such as specific gravity or freezing point of any of a plurality of liquids by a simple manipulation and whereby the corrected information for any of the liquids is available at a glance.

Further objects relating to details and economies of my invention will definitely appear from the description to follow. The invention is defined in the claims.

A structure embodying the features of my invention is illustrated in the accompanying drawings, wherein:

Fig. 1 is a perspective view of a preferred embodiment of the device or instrument of my invention.

Fig. 2 is an enlarged fragmentary view in section on line 2—2 of Fig. 1.

Fig. 3 is a fragmentary view partially broken away and in transverse vertical section, illustrating the correction scales or calibrated indicia relating to a plurality of different liquid antifreeze agents for the testing of which the particular device illustrated is adapted and the manner in which they are associated thereon.

Fig. 3A is a fragmentary view illustrating a modified type of temperature responsive means which may be employed in the device.

Fig. 4 is a view in elevation of a modified embodiment of my invention.

Fig. 5 is a view in section on line 5—5 of Fig. 4.

Fig. 6 is a fragmentary view in side elevation further illustrating the slide scale computing element of the last named embodiment.

This invention in general relates to hydrometers and in particular to devices for testing the freezing point of a liquid such as are designated by the term "thermohydrometers." These instruments are commonly used in the determination of the temperature corrected freezing point of a liquid, an anti-freeze solution for automobile radiators, for example. At present, a determination of the correct freezing point of such a liquid involves the ascertainment of the specific gravity of the liquid at the temperature of the latter at which the test is made and also the ascertainment of that temperature. These two readings are then referred to a suitable chart or table in order to arrive at an approximation of the actual or corrected freezing point of the liquid. The float usually employed for determining the specific gravity is floated in a part of the liquid fed to the tester which is at quite a different temperature than that influencing the temperature ascertaining element of the instrument, with the result that when compared to the aforesaid chart the temperature relied on is not in fact that of the liquid on which the float reading is based. Moreover, the usual charts or tables supplied by manufacturers of the instruments for this purpose arbitrarily specify widely separated gradations in the temperature range, there being, for example, ten or twenty degrees' difference between temperatures printed on the charts, with the result that should the temperature fall between these steps and should anything approaching an accurate corrected reading be desired, the user is obliged to make various mental calculations involving interpolation of numbers, which he is in the large majority of cases incapable of making with any degree of reliability. The result is that even when the specific gravity and temperature readings truly represent the condition of the fluid, there is likely to be a substantial error, but when the float and thermometer are subjected to liquid at different temperatures, then the error is multiplied so that no reliance whatsoever can safely be placed thereon.

In the device of my invention, both of these sources of inaccuracy are eliminated, in that I provide that the float and thermally responsive element thereof are as nearly as possible subjected to liquid at the same temperature, and in that means are provided not only eliminating the need of taking a separate temperature reading, but also make it possible by a simple manipulation to read off directly the desired corrected freezing point or specific gravity without any recourse whatsoever to mental calculation, charts, or tables.

My device further includes a thermally responsive element serving directly as a temperature indicator (there being no need for a temperature calibration or scale) with which are associated means for preventing obscuring of this indicator element by the dirty, cloudy, or rusty liquid usually tested, i. e., radiator anti-freeze liquid, so that ready observation of the position of the element is at all times possible.

Referring to the drawings, the reference numeral 1 in general indicates the preferred embodiment of my invention in a thermohydrometer for testing anti-freeze solutions such as are used in the cooling systems of internal combustion engines. This instrument has a transparent barrel 2 to the upper open end of which is attached a rubber bulb 3 for creating a reduced pressure in the barrel and thereby drawing liquid to be tested into the same. Referring to Fig. 2, the barrel 2 has the lower open end thereof secured to a sleeve 4 of rubber, said barrel carrying a radial flange 5 at its lower open end to locate and vertically position the same in the sleeve. This sleeve also has secured thereto by means of a similar flange 51 a downwardly extending cylindrical or tubular member 6 projecting beyond the lowermost end of sleeve 4; the purpose of member 6 will be hereinafter referred to. The barrel 2, sleeve 4, and cylindrical element 6 constitute a continuous cylindrical open ended chamber wherein a hydrometer float 7 is disposed, this float being preferably provided with suitable projections 8 for maintaining the same properly spaced from the wall of the chamber and having calibrations 81 on an extension thereof to designated different positions of the float relative to the level of a liquid being tested.

On its exterior, the sleeve 4 has fixedly secured thereto a further cylindrical sleeve 9 of transparent material or glass, the two sleeves 4 and 9 being secured to each other by an annular indentation 19 on the latter, which indentation serves a further purpose to be referred to. It will be perceived that transparent sleeve 9, tubular extension member 6 and the rubber sleeve 4 coact to provide an annular chamber 110 surrounding member 6 and acting as an air lock or seal operating on the principle of the diving bell to prevent substantial rise of liquid in the chamber, regardless of the liquid level in barrel 2.

At its lower end, the sleeve 9 is fitted or embedded into a hollow rubber base or housing 11. I preferably provide a single projecting lug 12 on the said lower end of sleeve 9 which coacts with a similar recess in the housing 11 to enable the housing and sleeve to be positioned in a predetermined angular relation to one another. The hollow housing has a chamber 13 in free communication with chamber 110 and in fact constituting a continuation thereof. Chamber 13 is in turn in communication with a liquid inlet chamber 131 provided with an inlet fitting 132 adapted to receive a suitable hose or line for admitting the liquid to be tested. Immediately above chamber 131, I provide a metal supporting spider 14 which is resistant to corrosion by the liquids tested and this spider carries an upstanding stem 15 serving as a fixed support for the center of a coiled bimetallic temperature responsive element 16 disposed in chamber 13. In assembling the device, it is necessary to fixedly secure the spider 14 in a predetermined angular relation to the base for a reason which will hereinafter appear. To this end, I propose to recess the spider at its periphery in any suitable manner, utilizing a rubber cement at these points to effect a bond with the rubber base 11 and thereby rigidly lock the spider in desired position. The stem 15 may be utilized as a support for float 7 in inoperative position of the latter, as illustrated, but if desired, other float supporting means may be utilized.

Alternatively, the spider might be molded into housing 11 with the stem 15 adjustable thereon. Other modifications in structural detail will be apparent to those skilled in the art.

At its free end, the thermally responsive bimetallic element 16 carries an upstanding indicating finger or pointer 17 which extends upwardly into the space between the exterior of cylindrical element 6 and the transparent glass sleeve 9, the pointer traveling in an arcuate path in this space as the temperature of fluid admitted to the instrument varies.

As pointed out above, the downwardly extending cylindrical element 6 provides an air lock or seal for the space between the same and the glass sleeve 9, effectively preventing the rise of liquid into this space and thereby preventing a view of the pointer 17 through the glass sleeve 9 from being obscured by the normally dirty or rusty radiator cooling liquid. It will be apparent that an absolutely liquid tight seal such as has been proposed for certain types of instruments employing a mercury thermometer would be impractical for an installation including a bimetallic thermally responsive element such as I employ.

I find the bimetallic thermally responsive element to afford amply reliable temperature indications, however my invention is by no means limited to this particular feature in the embodiment illustrated. The structure of Figs. 1 to 3 calls for a temperature indicating element which has a crosswise movement, hence, as illustrated in Fig. 3A, a suitable mercury or similar thermometer 171 having the bulb 172 thereof in chamber 13 and bent so that the temperature indicating column 173 extended crosswise in the air seal chamber 110 would be a quite satisfactory substitute for the structure illustrated. A spider supports the thermometer in operative position.

The exterior of cylindrical element 6 is preferably painted or glazed in a light color so as to afford a satisfactory background for viewing the finger or pointer 17 and if desired the latter may also be given a flash coating of any metal or other material which will improve its visibility through the transparent sleeve 9. It will now be perceived that it was for the purpose of imparting the said readily visible coating or glaze to element 6 that I have in the preferred embodiment constructed the same as an element separate from the glass barrel 2. It may in some cases, however, be practical and desirable to utilize the barrel itself for this purpose and I realize that if projected downwardly to the position occupied by the cylindrical element 6 a glass tube might be frosted or sand blasted to afford the desired background for the pointer 17. Obviously, the sleeve 4 and sleeve-like tubular member 6 house the float 7 in the same manner as barrel 2, in fact constitute an extension of the barrel, so that the barrel and sleeves may for all practical purposes be regarded as a single float enclosing barrel. Accordingly, I intend such a construction to fall within the scope of my invention.

By the aforesaid construction, the uncorrected specific gravity of the liquid may be ascertained by observing the calibrated characters 81 on the float 7 provided for this purpose. Pointer 17 at the same time assumes a position corresponding exactly with the temperature for said reading due to the close adjacency of bimetallic element 16 and the float to one another in the path of the incoming stream of liquid. It should be noted that no particular temperature indicia are provided for coaction with the pointer, the need for such indicia being eliminated in my device by the structure which will now be described.

The glass sleeve 9 and the barrel 2 have rotatably mounted thereon a one-piece barrel-like calculating member 19 which is preferably of a suitably opaque, rigid though inexpensive, material such as Bakelite or molded hard rubber. In order to rotatably support the same, I utilize a split annular, polygonally shaped wire spring element 20 which coacts with the annular groove 101 formed by the indentation 10 in sleeve 9 and also with a similar annular internal groove 21 formed on the molded calculating member. The angles of the aforesaid wire element coact with the groove 21 while the sides thereof lie in and coact with groove 10. This element 20 may be readily compressed circumferentially to allow the barrel-like member 19 to be telescoped over sleeve 9 in operative relation, the wire element 20 then springing outwardly for frictional sliding engagement with the grooves as described above. This element is preferably of suitable stiffness to successfully resist inadvertent longitudinal or axial displacement of the member 19 once it is assembled in proper position, permitting the latter to be rotated as desired, however. In addition to holding it and guiding the calculating member on the instrument, the wire element 20 serves as a spring brake exerting a predetermined amount of friction on the member for maintaining the same in any position to which it is adjusted.

The calculating member 19 has a number of vertically spaced and appropriately labelled indicator windows 22 formed therein, each provided with a pointer nib 221. These indicator windows are respectively in vertical register with scales, calibrations, or calibrated bands 23 on the sleeve 9 and spaced vertically from one another in correspondence to the spacing of the windows 22. These scales are clearly illustrated in Fig. 3, being preferably applied to sleeve 9 by decalcomania or transfer process, although it is evident that they may be printed directly on the sleeve or printed on strips adhesively secured to the sleeve, or otherwise if desired.

The scales in the illustrated embodiment are calibrated in freezing points of various different liquids for which my device is intended, for example, such commonly known agents as alcohol, "Zerone," "Prestone" (ethylene glycol), and glycerine. The calibration of these scales is non-uniform since the relation of specific gravity and temperature is non-linear, i. e., a liquid has a different increment of specific gravity for a given temperature increment in one part of the temperature range than its specific gravity increment for a temperature increment in another part of the temperature range. These values are readily and accurately computed or supplied by reference tables relating to temperature corrected specific gravity, freezing point and the like. Of course, the freezing point is a function of the corrected specific gravity, hence obviously by calibrating float 7 directly in terms of uncorrected specific gravity, either letters or numerals, and the scales 23 in terms of corrected specific gravity it is possible to adapt my device for furnishing directly a reading of this information, thus extending the use thereof to the testing of many other liquids or liquid mixtures such as battery electrolytes, photographic developers and fixatives, and the like.

At a point adjacent its lowermost edge, the calculator member 19 carries a scale 24 calibrated similarly to the calibrations 81 on the hydrometer float 7. If the float is calibrated uniformly in terms representing uncorrected specific gravity and if the progress of the temperature indicating member 17 is linear with respect to temperature, then the scale 24 on the movable calculator member must be non-uniform by reason of the non-linear relationship between specific gravity and temperature. This non-linear relationship may be expressed in my instrument in any of several ways. For example, the float may be provided with non-uniform calibration intervals or the thermometer or temperature indicator might be given a non-linear movement (within the range of temperatures tested by my instrument the element 16 has a substantially linear response, but other similar bimetallic elements are available on the market which, due to the combinations of metals used therein, may be non-linear in their reaction to temperature changes within the range covered by a thermohydrometer of the type under consideration), or the movable scale may have non-uniform calibration intervals, or a combination of these three expedients might be employed. I have chosen the last named of the three expedients, namely, a non-uniform calibration of the movable calculator scale 24, but do not wish to be unduly limited in this respect.

If the calibrations on the float and calculating member are not deemed sufficiently fine, they may of course be further subdivided as desired (although I have not shown this, in order to simplify the drawings) so as to enable any desired accuracy in taking a reading thereon. The calibrations 24 are located on the calculating member at a point closely adjacent the finger or pointer 17 so as to be capable of being readily alined therewith by rotation of member 19.

In order to facilitate rotary adjustment of the calculating member 19, I contemplate knurling the same at 25.

In use, the bulb 3 is actuated to draw a suitable quantity of liquid to be tested into barrel 2, causing the float to assume a certain position therein. The position of the float relative to the liquid level is observed, noting the indicia 81, and the calculating member 19 is then rotated until the indicium corresponding to the liquid level is located immediately above the temperature indicating finger or pointer 17. All the necessary manipulation is now finished and the user simply observes through the appropriate window the freezing point of the liquid being tested. There is no need for any consultation of tables or charts or of highly undependable mental calculation. The exact freezing point is immediately ascertainable at a glance. Furthermore, the results are exceedingly reliable by reason of the fact that the temperature indicating element and float are brought into as close adjacency as possible, whereby they are subjected to approximately the same temperature.

In Figs. 4, 5, and 6, I illustrate a modified embodiment of my invention, in which a pair of transparent barrels are provided, one to receive the float and the other having disposed therein a thermometer of the type employing a column of mercury or other thermally responsive liquid. Specifically, the reference numeral 26 designates a hollow cylindrical float barrel open at both ends and inserted at its top in a rubber head 27 formed integral with the bulb 28, there being a passage 29 communicating the open end of barrel 26 with the bulb. The lower end of barrel 26 communicates with a chamber 291 in a rubber fitting 30 provided with an intake nipple 31. This last named fitting is adapted to receive the lower end of another cylindrical transparent tubular barrel 32 whose upper end is secured in and sealed by the head 27.

The usual float 33 is disposed in barrel 26 while the barrel 32 serves as a housing for a mercury or other type thermometer 34 whose bulb 35 is disposed in chamber 291.

I preferably employ the air lock or air seal principle to prevent entrance of liquid into the thermometer barrel 32, utilizing if desired a suitable spider-like element 36 to engage the thermometer 34 above the bulb 35 thereof and thereby position the thermometer vertically in the barrel 32.

I mount a slidable calculating member 37 on the barrel 32 for sliding adjustment lengthwise thereof. Although the particular form of this member may vary, I illustrate the same as made up of a sheet metal member 38 bent to encircle the barrel 32 and adjustably clamped at 381 with the free ends thereof brought partially around and in frictional engagement with float barrel 26 whereby to exert a predetermined amount of friction on the latter to hold the calculating member in any position to which it may be slidably moved.

In Figs. 4, 5, and 6, I illustrate the embodiment thereof as adapted for testing of anti-freeze solutions and accordingly I provide a plurality of windows 39 therein with appropriate identifying indicia therefor. The slidable calculating member likewise has an elongated slot 40 extending parallel to the length of barrel 32, this slot having specific gravity indicating characters disposed along the side thereof, which characters are similar to the markings on the float 33 and spaced similarly. The barrel 32 has calibrated scales 231 thereon similar to scales 23 and indicating freezing points for the various liquids to be tested, these scales being in lateral alinement with the corresponding windows 39. In use, the liquid is admitted to barrel 26 and the level at which the float rests therein is noted by reference to the indicating characters on the float. The calculating member 37 is then shifted vertically until a corresponding character is positioned in coincidence with the level of the mercury or other thermally responsive liquid in the thermometer. The corrected freezing point is then read directly through the appropriate window 39.

Although shown in the form of an anti-freeze testing device, the embodiment of Figs. 4, 5, and 6 like that of Figs. 1–3 is well adapted for the testing of other liquids, it being only necessary to scale the barrel 32 in indicia representing, for example, corrected specific gravity corresponding to the uncorrected reading observed on float 33. The calculating member 37 would be manipulated in the same manner as described above to ascertain directly the temperature-corrected specific gravity of the solution tested.

I have illustrated and described my improvements in embodiments which are very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. A liquid testing instrument adapted to afford a direct reading of temperature-corrected specific gravity of the liquid tested, comprising a barrel having a float therein and adapted to receive the liquid to be tested, calibrations on the float to enable a reading of the position of the float relative to liquid in the barrel to be taken, said barrel being transparent at least in part for that purpose, an inlet chamber communicating with the interior of said barrel and into which liquid is adapted to be drawn, and a cylindrical sleeve surrounding the lower end of said barrel and coacting therewith to define an annular chamber between the barrel and sleeve, said chamber communicating with said inlet chamber and being closed at its upper end to provide an air lock preventing substantial entrance of liquid into the annular chamber, a coiled bimetallic thermally responsive element fixed at its center in said inlet chamber adjacent said barrel and having an indicating finger projecting into the air filled space in said annular chamber, said bimetallic element responding to the temperature of fluid admitted to the inlet chamber to shift said finger, and a calculating member rotatably mounted on said sleeve and having vertically spaced windows therein, said sleeve having scales thereon bearing corrected indications of freezing points for various liquids tested disposed in alinement with the respective windows, said calculating member having calibrated indicia corresponding to calibrations on the float disposed thereon at a point adjacent the finger on said thermally responsive element, said calculating member being rotatable relative to said element to position the calibrations with reference to the finger and thereby adjust the windows with reference to the scales so that a corrected reading may be taken directly through the appropriate window for the liquid being tested.

2. A liquid testing instrument adapted to afford a direct reading of temperature-corrected specific gravity of the liquid tested, comprising a barrel having a float therein and adapted to receive the liquid to be tested, calibrated means to enable a reading of the position of the float relative to liquid in the barrel to be taken, said barrel being transparent at least in part for that purpose, an inlet chamber communicating with the interior of said barrel and into which liquid is adapted to be drawn, and a member secured to said barrel and coacting therewith to define an air seal chamber communicating with said inlet chamber and preventing substantial entrance of liquid into the air seal chamber, a fixedly mounted thermally responsive element in said inlet chamber having an indicating finger projecting into the air seal chamber, said element responding to the temperature of fluid admitted to the inlet chamber to shift said finger, and a calculating member adjustably mounted on said instrument and having a window therein, said instrument having a scale thereon bearing corrected indications for a liquid tested disposed in alinement with the window, said calculating member having calibrated indicia corresponding to said first named calibrated means disposed thereon at a point adjacent the finger on said thermally responsive element, said calculating member being adjustable relative to said element to position the calibrations with reference to the finger and thereby adjust the window with reference to the scale so that a corrected reading may be taken directly through the window.

3. A liquid testing instrument adapted to afford a direct reading of temperature-corrected specific gravity of the liquid tested, comprising a barrel having a float therein and adapted to receive the liquid to be tested, calibrated means to enable a reading of the position of the float relative to liquid in the barrel to be taken, said barrel being transparent at least in part for that purpose, an inlet chamber communicating with the interior of said barrel and into which liquid is adapted to be drawn, thermally responsive means disposed in said inlet chamber and including an indicating element, said means responding to the temperature of fluid admitted to the instrument, and said chamber having a transparent wall enabling the position of the indicating element to be ascertained from the exterior of the instrument, and a calculating member shiftably mounted on said instrument and having a window therein, said instrument having a scale thereon bearing corrected indications for the liquid tested disposed in alinement with the window, said calculating member having calibrated indicia corresponding to calibrations on the float disposed thereon adjacent the indicating element and being shiftable relative to said element to position the calibrations on the calculating member with reference to the indicating element and thereby adjust the window so that a corrected reading from said scale may be taken directly through the window.

4. A correction device for the testing of specific gravity of a liquid and directly affording temperature-corrected information relating to the specific gravity of the liquid being tested, comprising a thermally responsive member adapted to be subjected to the temperature of liquid in the device and including means adapted to assume a predetermined position indicating the temperature of the liquid, calibrated means for indicating the uncorrected specific gravity of the liquid tested, an adjustable member on the device having indicia thereon related to the calibrations on said means and being adjustable to position the aforesaid indicia coincident with the temperature indicating means, and correction indicia on the device affording information related to the specific gravity of the liquid at different temperatures thereof, said adjustable member coacting with said correction indicia to indicate the desired temperature-corrected information when appropriately set relative to the temperature indicating means.

5. A correction device for the testing of specific gravity of a liquid and directly affording temperature-corrected information relating to the specific gravity of the liquid being tested, comprising a thermally responsive member adapted to be subjected to the temperature of liquid in the device and including means adapted to assume a predetermined position indicating the temperature of the liquid, means for determining the uncorrected specific gravity of the liquid, a member on the device adjustable in accordance with the uncorrected specific gravity of the liquid to a predetermined position coincident with the temperature indicating means, and correction indicia on the device affording information related to the specific gravity of the liquid at different temperatures thereof, said adjustable member coacting with said correction indicia to indicate the desired temperature-corrected information when appropriately set relative to the temperature indicating means.

6. In a device for directly furnishing temperature-corrected information relating to the specific gravity of a liquid, means on said device for ascertaining and indicating the temperature of a liquid whose temperature-corrected specific gravity or a property dependent thereon it is desired to ascertain, means fixedly mounted on said device having a scale thereon relating to the temperature-corrected specific gravity of a liquid to be tested, and a member rotatably adjustable relative to said fixed and first named means and having means thereon adapted to be positioned coincident with the first named means to set the adjustable member, said adjustable member when appropriately set coacting with said scale to indicate the desired temperature-corrected information for the liquid in question.

7. A device for testing specific gravity and related properties of a liquid and for providing directly temperature-corrected readings thereof, comprising a barrel, a float therein, heving buoyancy indicia means for admitting the liquid to the interior of the barrel, means for affording a visual indication of the temperature of the liquid admitted to the barrel, and a manually actuable member on said device having indicia thereon relating to said float buoyancy indicia, said member being longitudinally shiftable on the device parallel to the barrel to bring an indicium thereon corresponding to a float buoyancy indicium into coincidence with the temperature indicating means, said device having a fixed scale thereon affording temperature-corrected information relating to the specific gravity of the liquid and said member having a window exposing said scale and the temperature-corrected information thereon corresponding to the temperature of the liquid tested.

8. A device for testing specific gravity and related properties of a liquid and for providing directly temperature-corrected readings thereof, comprising a barrel, means fo affording visual indications relating to the uncorrected specific gravity of liquid admitted to the barrel, means for affording a visual indication of the temperature of the liquid admitted to the barrel, and a manually actuable member on said device having indicia thereon corresponding to said specific gravity indications, said member being shiftable lengthwise on the device to bring an indicium thereon corresponding to the specific gravity indication of the liquid tested into coincidence with a position taken by the temperature indicating means, said device having a fixed scale thereon affording temperature-corrected information relating to the specific gravity of the liquid and said member coacting with said scale to designate the particular desired temperature-corrected information thereon corresponding to the temperature of the liquid tested.

9. An instrument for testing liquids enabling corrected specific gravity to be directly read therefrom, comprising a barrel, a float in said barrel, calibrated means for visually indicating the relative position of said float in liquid in said barrel, an inlet chamber adapted to be filled by liquid drawn into said barrel, a further chamber communicating with said inlet chamber including a wall which is transparent at least in part, thermally responsive temperature indicating means disposed in said inlet chamber and including an indicating element extending into said further chamber and visible through said wall, a calculating member rotatably mounted on said wall and having calibrated indicia thereon similar to the system of calibration of said first named means, and a fixed scale on said wall calibrated in terms of a property of the liquid dependent on specific gravity, said calculating member having a viewing opening registering with said scale whereby the corrected property of the liquid dependent on specific gravity may be read from the latter when an indicium on the calculating member corresponding to a calibration on said first named means indicating the relative position of the float in the liquid is properly positioned with reference to the temperature indicating element by rotation of the calculating member on said wall.

10. In a liquid testing device of the type described, a chamber adapted to have a liquid to be tested admitted thereto, a barrel communicating with said chamber for admission of the liquid to the barrel and adapted to have a float disposed therein for the determination of specific gravity, a thermally responsive member disposed in said chamber in heat conducting relation to the liquid entering said barrel, said member having indicating means associated therewith a portion of which is adapted to be viewed from the exterior of the device, and means for preventing a substantial rise of the liquid in said chamber relative to said indicating means, comprising a partition member in said chamber coacting therewith to provide an air seal recess in which said portion of the indicating means is disposed with the uppermost limit of said portion beneath the top of said recess, said chamber having an outer wall thereof at least partially transparent to permit viewing of said indicating means, said air seal recess preventing obscuring of said portion by liquid admitted to the chamber.

11. In a liquid testing device of the type described, a chamber adapted to have a liquid to be tested admitted thereto, thermally responsive means including a member disposed in said chamber in heat conducting relation to liquid admitted to said chamber and an indicating element secured to and movable in response to movement of said member and adapted to be viewed from the exterior of the device, and means for preventing a substantial rise of the liquid relative to said indicating element and likely to obscure the same, comprising a partition member coacting with said chamber and constituting an air lock compartment in which the indicating element is disposed with the uppermost limit of said portion beneath the top of said recess.

12. In a liquid testing device of the type described, a chamber adapted to have a liquid to be tested admitted thereto, thermally responsive means exposed to liquid admitted to said chamber and including an indicating element having a portion adapted to be viewed from the exterior of the device, and means for preventing obscuring of said indicating element by liquid influencing said thermally responsive means, comprising a partition member coacting with said chamber and constituting an air lock compartment in which said viewed portion of the indicating element is disposed with the uppermost limit of said portion beneath the top of said recess.

13. A testing instrument for ascertaining temperature corrected specific gravity or an attribute of a liquid dependent thereon, comprising a container device adapted to receive a liquid to be tested and having a float therein for ascertaining specific gravity, said float being calibrated in terms reflecting uncorrected specific gravity, thermally responsive means in said device subjected to the temperature of liquid entering the same and including an indicating element movable in linear relation to the temperature of the liquid, and a calculating member movably mounted on said device, said calculating member having non-linearly expressed calibrations in terms corresponding to the calibrations of said float, said calculating member being shiftable on said device to position said last named calibrations with reference to said linearly movable temperature indicating element, and a scale on said device calibrated non-linearly in accordance with the temperature corrected specific gravity of a given liquid, said calculating member having an indicator thereon coacting with said last named scale and indicating thereon the temperature corrected specific gravity or related attribute of said given liquid.

14. A testing instrument for ascertaining temperature corrected specific gravity or an attribute of a liquid dependent thereon, comprising a container device adapted to receive a liquid to be tested and having a member for ascertaining specific gravity, said member being calibrated in terms reflecting specific gravity, thermally responsive means in said device subjected to the temperature of liquid entering the same and including an indicating element movable in response to the temperature of the liquid, and a calculating member movably mounted on said device, said calculating member having calibrations in terms corresponding to the calibrations of said first named member, said calculating member being shiftable on said device to position said last named calibrations with reference to said temperature indicating element, and a scale on said device calibrated in accordance with the temperature corrected specific gravity of a given liquid, said calculating member having an indicator thereon coacting with said last named scale and indicating thereon the temperature corrected specific gravity or related attribute of said given liquid, the calibrations on at least one of said members being non-linear.

15. A testing instrument for ascertaining temperature corrected specific gravity or a characteristic of the liquid dependent thereon, comprising a container adapted to receive a liquid to be tested and having means associated therewith and actuable by liquid admitted to the container to a predetermined position depending upon the specific gravity of the liquid, a thermally responsive element mounted in said container and subjected to the temperature of liquid admitted to the same, said element including an indicating member movable in linear relation to the temperature of the liquid, and a member calibrated non-uniformly in terms related to specific gravity, said last named member being movable on the instrument and adapted to be positioned coincident with said indicating member in accordance with the specific gravity of the liquid actuating said first named means, a scale on the instrument calibrated in terms of said characteristic said calibrated member coacting with said scale to afford a direct reading of said temperature corrected characteristic.

16. An instrument for affording direct readings of temperature corrected specific gravity or a characteristic of the liquid dependent thereon, comprising a container device adapted to receive a liquid to be tested and having means associated therewith actuable by liquid admitted to the container to a predetermined position in accordance with the specific gravity of the liquid, thermally responsive means mounted in said container and subjected to the temperature of liquid admitted to the same, said means having an indicating member movably positioned in response to changes in temperature of the liquid, and a member movably mounted on said device and having means thereon adapted to be predeterminedly positioned relative to said temperature indicating member in accordance with the positioning of said first named means, and scale means with which one of said members coacts to furnish said readings, the movement of at least one of said members being non-linear with reference to the attribute of the tested liquid in accordance with which it is positioned.

17. A testing instrument for ascertaining temperature corrected specific gravity or an attribute of a liquid dependent thereon, comprising a container device adapted to receive a liquid to be tested and having a member for ascertaining specific gravity, said member being calibrated in terms reflecting specific gravity, thermally responsive means in said device subjected to the temperature of liquid entering the same and including an indicating element movable in response to the temperature of the liquid, and a calculating member movably mounted on said device, said calculating member having calibrations in terms corresponding to the calibrations of said first named member, said calculating member being shiftable on said device to position one of said last named calibrations corresponding to a calibration on the first named member in coincidence with said temperature indicating element, and a scale on the device calibrated in terms related to said attribute with which said calibrating member coacts to afford a reading of said attribute, the calibrations on at least one of said members being non-linear.

18. In a device for directly furnishing temperature corrected information relating to the specific gravity of a liquid, means on said device for ascertaining and indicating the temperature of a liquid whose temperature corrected specific gravity or a property dependent thereon it is desired to ascertain, scale means fixedly associated on said device having a set of indications relating to the specific gravity of a liquid to be tested, and a member rotatably adjustable relative to said first named and last named means and having a set of indications thereon likewise relating to specific gravity, and adapted to be rotatably adjusted to relatively position said two sets of indications in predetermined relation in accordance with the temperature and specific gravity of the liquid, said temperature indicating means coacting with one of said sets of indications when in coincidence with a given indication thereon to enable the proper adjustable positioning of said member and the other set of indications coacting with the thus positioned member to indicate the desired temperature corrected information for the liquid in question.

19. A device for ascertaining a temperature corrected attribute of a liquid, comprising a chamber adapted to have a liquid to be tested admitted thereto, the wall of said chamber being transparent at least in part, thermally responsive means mounted in the chamber to be exposed to liquid admitted thereto and including an indicating element extending vertically with reference to the level of liquid admitted to the chamber, and means for limiting the rise of liquid in said chamber to a point below the top of said indicating element, comprising a downwardly extending partition member in said chamber having an air tight seal at its upper end to the chamber wall and defining an air lock compartment between said wall and partition member, said compartment receiving the top of said indicating element, said thermally responsive means and indicating element being mounted in their entirety within said chamber and compartment and beneath the seal at the upper end of the latter, the lower edge of said partition member terminating beneath the top of said indicating element and above the bottom of said chamber, said air lock compartment preventing rise of liquid therein to obscure said element whereby the latter may be viewed through said chamber wall from the exterior of the chamber.

20. In a testing instrument of the type described, a base including a container to receive liquid to be tested, a closed-top air lock chamber associated with said base in liquid communication at the bottom thereof with the container for the admission to the chamber of liquid from said container, said chamber preventing rise of liquid to be tested beyond a predetermined level therein and having a transparent wall member disposed on the exterior of the instrument permitting viewing of the interior of said chamber from the exterior of the container, and a thermally responsive element disposed in the container to be thermally influenced by liquid entering the same, said thermally responsive element having an indicating portion disposed in said air lock chamber above the level of liquid therein whereby said indicating portion of the element may be viewed through said wall member from the exterior of the instrument, said element and portion being disposed in their entirety beneath the top of said air lock chamber.

21. In a testing instrument of the type described, a base having a chamber for the reception of liquid to be tested, said base having an annular outer transparent wall member for the chamber associated therewith, elongated, barrel-like, float enclosing means connected to said base and communicating with said chamber to receive liquid therefrom, said means including an annular tubular element concentric at one end thereof with said member and extending axially therein in axially overlapping, radially spaced, telescoping relation thereto, said member and element having the annular space therebetween sealed above the lower edge of said element to define an annular air seal recess in said member, a temperature indicating member disposed in said chamber to be thermally influenced by liquid entering the latter, said temperature indicating member and element being disposed in their entirety in said chamber and recess, said temperature indicating member including an indicating element extending into said air seal recess and moveable laterally therein, and being adapted to be viewed through said transparent member from the exterior of the latter, a collapsible bulb fitted on the other end of said element and an inlet tube communicating with said chamber for the admission of liquid thereto upon manipulation of said bulb.

22. In a testing instrument of the type described, a base having a chamber for the reception of liquid to be tested, said base having an annular outer transparent wall member for the chamber associated therewith, means connected to said base and communicating with said chamber to receive liquid therefrom, said means including an element in axially overlapping, telescoping relation in said chamber, said member and element having a radial space therebetween sealed above the lower edge of said element to define an air seal recess between the member and element, a temperature indicating member disposed in said chamber to be thermally influenced by liquid entering the latter, said temperature indicating member and element being disposed in their entirety in said chamber and recess, said temperature indicating member including an indicating element extending into said air seal recess and moveable laterally therein, and being adapted to be viewed through said transparent member from the exterior of the latter, said device having means for drawing liquid into said chamber.

JOSEPH T. WEBBER.